Patented Dec. 31, 1935

2,025,943

UNITED STATES PATENT OFFICE 2,025,943

GREASE PAINT

Frank Factor, Beverly Hills, Calif., assignor to Max Factor & Co., Los Angeles, Calif., a corporation of Delaware No Drawing. Application December 4, 1934, Serial No. 755,928

3 Claims. (Cl. 167—90)

This invention relates generally to cosmetics, and has for its object to provide a new grease paint possessing numerous distinct advantages over grease paints of the types heretofore used. The past practice has been to make grease paints either as a non-flowing paste or cream, or in the form of a solid stick, ingredients such as petroleum jelly, wax or the like being used to give the paint a solid or semi-solid body. It is apparent that the pasty or solid consistency of these paints makes it comparatively difficult to apply them in the most effective and advantageous manner, that is, in a uniformly thin coating which, by virtue of its uniform thinness, has the desired flexibility. The reason is that paints of such consistency have in themselves no appreciable spreading power and can only be spread by prolonged rubbing and under the pressure of the hand, and even then with no greater uniformity than that which can result solely from movements of the hand. Additionally, the heavy consistency of such paints limits the thinness of the coating that can be applied without extensive rubbing.

My chief purpose is to provide a grease paint that may be applied quickly and much more easily in a uniformly thin and flexible coating, without the necessity for extensive massaging of the skin. In accordance with the invention, I have developed a grease paint characteristically new and different from a physical standpoint, in that it is a free flowing liquid, instead of a solid or semi-solid, having an inherently greater spreading and covering capacity than the usual forms of grease paints. Being liquid, my improved grease paint readily spreads when applied, and has such superior covering power that a small quantity may be quickly applied to the skin in a uniformly thin coating without the necessity for prolonged rubbing. Whereas there is frequently a tendency for some of the common grease paints to dry and crack on the skin after long exposure to air, particularly where the paint film is comparatively thick, the present liquid paint remains sufficiently moist and flexible to preclude the possibility of cracking.

The present liquid grease paint has been developed primarily to be used in make-up for motion picture photography, and possesses certain characteristics that render it particularly superior for that purpose. In the first place, it is desired to provide a grease paint that will retain, after being applied to the skin, its original appearance, flexibility and resistance to cracking, over long periods of time so as to obviate any necessity to change or reapply make-up during the filming of one sequence or series of sequences. Due to the intense lighting and other conditions required in the photographic processes, there is a tendency for the grease paints to dry and crack in short periods of time. The invention overcomes this difficulty by providing a grease paint in which the filming and solid particle carrying ingredient comprises a non-volatile oil, as distinguished from the usual grease paints in which the pigment carrier is a semi-solid paste or waxy substance. Another advantage of the present grease paint is capacity for carrying greater proportionate amounts of pulverulent solids, without resulting in premature drying and cracking as a result of increased solid content. In this respect, the utility of the usual pasty grease paint is limited in that when loaded with solids beyond a limiting proportion, they become too stiff to spread properly and display early drying and cracking tendencies.

Another characteristic of as usual grease paints heretofore developed is that the use of cold cream has been required to remove them from the skin, soap and water being ineffective because of the extremely high surface tension of the oils and greases contained in the paint. A further object of the invention is to provide a liquid grease paint that can readily be removed from the skin with soap and water as well as with cold cream, and in this respect.

Generally speaking, the present grease paint comprises a free flowing liquid composition including a suitable oil or selected mixture of oils, a pulverulent texture ingredient which gives the paint the desired body and smoothness, and suspended color pigments, the shades of which may vary for different paints. A wide variety of oils may be used, as will be readily understood by those familiar with the art, although I may cite as typical of the oil ingredient of the paint composition, the following oils and waxes which may be used individually or together in any desired proportions: Olive, almond, castor, cotton seed, lanolin, mineral and sulphonated olive and castor oils, and paraffin, carnauba and japan waxes. The following may be cited as typical texture ingredients: Zinc and aluminum stearates, talc, kaolin and the oxides of titanium, zinc and magnesium. The suspended pigment may consist of any of the usual substances such as iron oxide and Lake colors.

It may be stated with reference to the texture ingredient, that titanium oxide has been found particularly suitable and advantageous in a liquid form of grease paint. This particular oxide has an unusually great spreading capacity and, being incorporated in a liquid which itself has great covering power, contributes largely to this characteristic feature of the product.

For the purpose of setting forth specific examples of liquid grease paint compositions coming within the purview of the invention, the following may be cited as typical of a liquid paint removable from the skin either by cold cream or by soap and water:

|  |  | Parts |
|---|---|---|
| Oils | Olive | 15 |
|  | Mineral | 40 |
| Surface tension reducing agencies | Triethanolamine | 4 |
|  | Stearic acid | 6 |
| Texture ingredients | Zinc oxide | 7 |
|  | Titanium oxide | 18 |
| Pigments | Yellow iron oxide | 7 |
|  | Red Lake | 1 |
|  | Yellow Ochre | 2 |

An optional mixture may consist of:

|  |  | Parts |
|---|---|---|
| Oils | Almond | 12 |
|  | Mineral | 40 |
|  | Lanolin | 3 |
| Surface tension reducing agencies | Sulphonated alcohol | 8 |
|  | Cetyl alcohol | 2 |
| Texture ingredients | Talc | 5 |
|  | Kaolin | 5 |
|  | Zinc oxide | 10 |
|  | Titanium oxide | 10 |
| Pigments | Yelow iron oxide | 4 |
|  | Red Lake | 1 |

In preparing the composition, referring particularly to the first cited composition, a mixture of the olive and mineral oils, together with the triethanolamine and stearic acid is heated and the solids melted in the oil. The resulting mixture is then combined with the texture ingredients and pigments, and the entire mixture put through a colloidal mill which disperses the pulverulent solids into the oil in an extremely fine colloidal state, forming a permanent suspension of the fine solid particles in the liquid.

Triethanolamine and stearic acid are put into the composition for the purpose of reducing the surface tension of the oils to the extent that the paint is rendered readily removable from the skin by soap and water. In the second formula, the sulphonated and cetyl alcohols are the surface tension reducing agencies. In the event it may be desired to require the use of cold cream for removing the paint, these surface tension reducing compounds may be omitted from the formulas. Typical oil surface tension reducing compounds, in addition to those mentioned above, include sulphonated alcohols, cholestral, iso-cholestral and the glycerol stearates.

It may be stated with reference to the liquid grease paints that while their compositions may vary considerably in accordance with the particular characteristics desired in the product, the compositions will contain at least substantially 35-40 parts of liquid oils, and at least around 20 parts of texture oxides.

I claim:

1. A non-drying cosmetic grease paint comprising a free flowing liquid composition including non-volatile oil in sufficient proportion that after applied to the skin the paint forms a flexible film that remains moist and resistant to cracking, a pulverulent texture ingredient and suspended pigment, and an ingredient reducing the surface tension of the oil in said composition to render the paint readily removable from the skin by soap and water.

2. A non-drying cosmetic grease paint comprising a free-flowing liquid composition including non-volatile oil in substantially larger volumetric proportion than any of the other ingredients, so that when applied to the skin the paint forms a flexible film that remains moist and resistant to cracking, a pulverulent texture ingredient, and an ingredient reducing the surface tension of the oil so that the paint is readily removable from the skin by soap and water.

3. A non-drying cosmetic grease paint comprising a free-flowing liquid composition including at least substantially 35-40 parts of non-volatie oil, so that when applied to the skin the oil forms a moist film that remains flexible and resistant to cracking, said paint also containing at least substantially 20 parts of pulverulent texture ingredient, suspended pigment, and an ingredient reducing the surface tension of the oil in said composition to render the paint readily removable from the skin by soap and water.

FRANK FACTOR.